(12) United States Patent  (10) Patent No.: US 7,809,522 B2
Wargon  (45) Date of Patent: Oct. 5, 2010

(54) APPARATUS AND METHOD FOR DETERMINING AND NUMERICALLY DISPLAYING A VOLUME DEPENDENT CHARACTERISTIC OF ANY UNSEPARATED PART OF AN ITEM

(76) Inventor: Kenneth Wargon, Unit 216, 9-15 Central Avenue, Manly, NSW 2095 (AU)

( * ) Notice: Subject to any disclaimer, the term of this patent is extended or adjusted under 35 U.S.C. 154(b) by 0 days.

(21) Appl. No.: 12/042,939

(22) Filed: Mar. 5, 2008

(65) Prior Publication Data

US 2008/0221829 A1 Sep. 11, 2008

Related U.S. Application Data

(60) Provisional application No. 60/893,228, filed on Mar. 6, 2007.

(51) Int. Cl.
*G01B 5/26* (2006.01)
(52) U.S. Cl. .................................... 702/156
(58) Field of Classification Search ................ 702/150, 702/156
See application file for complete search history.

(56) References Cited

U.S. PATENT DOCUMENTS

| | | |
|---|---|---|
| 3,588,480 A | 6/1971 | Unger |
| 3,762,257 A | 10/1973 | Matthews, Jr. |
| 3,851,720 A | 12/1974 | Williams, Jr. |
| 4,156,367 A | 5/1979 | Pardo et al. |
| 4,512,192 A | 4/1985 | Peters |
| 4,557,019 A | 12/1985 | Van Devanter et al. |
| 4,598,618 A | 7/1986 | Kuchler |
| 4,699,006 A | 10/1987 | Boxenhorn |
| 4,703,443 A | 10/1987 | Moriyasu |
| 4,726,094 A | 2/1988 | Braeger |
| 4,767,212 A | 8/1988 | Kitahashi et al. |
| 4,773,029 A | 9/1988 | Claesson et al. |
| 4,868,951 A | 9/1989 | Akesson et al. |

(Continued)

FOREIGN PATENT DOCUMENTS

DE  42 15 527 A1  11/1993

(Continued)

OTHER PUBLICATIONS

European Supplementary Search Report.

(Continued)

*Primary Examiner*—Bryan Bui
(74) *Attorney, Agent, or Firm*—John R. Benefiel

(57) ABSTRACT

An apparatus and method for determining and numerically displaying the volume of an item or any part of the item by passing a manually held sensor member freely movable in both vertical and horizontal directions over and along an item lying on a support surface. Sensor and movement detector arrangements generate signals from which the volume of any segment of the item passed over is calculated. The calculated volume of part or all of the item may be converted into numeric values corresponding to the calculated volume such as weight or price numeric values based on an item density or cost per unit weight factor for the particular type of item on the support surface, whereby numeric weight and cost values of any segment of the item are displayed in a numeric display as the sensor member is passed along the item.

27 Claims, 12 Drawing Sheets

U.S. PATENT DOCUMENTS

| | | | |
|---|---|---|---|
| 4,875,254 | A | 10/1989 | Rudy et al. |
| 4,901,253 | A | 2/1990 | Iwano et al. |
| 4,945,765 | A | 8/1990 | Roszhart |
| 4,962,568 | A | 10/1990 | Rudy et al. |
| 5,006,487 | A | 4/1991 | Stokes |
| 5,054,345 | A | 10/1991 | Weber |
| RE33,851 | E | 3/1992 | Rudy et al. |
| RE33,904 | E | 4/1992 | Rudy et al. |
| 5,142,160 | A | 8/1992 | Storbeck |
| 5,163,865 | A | 11/1992 | Smith |
| 5,184,733 | A | 2/1993 | Arnarson et al. |
| 5,202,740 | A | 4/1993 | Kivits |
| 5,226,334 | A | 7/1993 | Pegoraro |
| 5,359,511 | A | 10/1994 | Schroeder et al. |
| 5,392,650 | A | 2/1995 | O'Brien et al |
| 5,422,861 | A | 6/1995 | Stringer et al. |
| 5,499,194 | A | 3/1996 | Prestidge et al. |
| 5,739,426 | A | 4/1998 | Storm |
| 5,937,080 | A | 8/1999 | Vogeley, Jr. et al. |
| 6,125,338 | A | 9/2000 | Brienza et al. |
| 6,164,174 | A | 12/2000 | Sigurdsson et al. |
| 6,407,818 | B1 | 6/2002 | Whitehouse |
| 6,700,563 | B1 | 3/2004 | Koizum |
| 6,701,279 | B1 | 3/2004 | Hawes |
| 6,813,585 | B2 | 11/2004 | Leutz et al. |
| 6,940,564 | B2 | 9/2005 | Murden et al. |
| 7,010,457 | B2 | 3/2006 | Wargon |
| 7,158,915 | B2 | 1/2007 | Wargon |
| 2002/0148130 | A1 | 10/2002 | Ohtsuka |
| 2004/0211258 | A1 | 10/2004 | Geen |
| 2006/0155509 | A1 | 7/2006 | Wargon |

FOREIGN PATENT DOCUMENTS

| | | |
|---|---|---|
| JP | 2002257504 | 11/2002 |

OTHER PUBLICATIONS

The Art of Electronics Second Edition; Paul Horowitz and Winfield Hill.

Seungbae Lee, Gi-Joon Nam, Junseok Chase, and Hanseup Kim, Design of Padless Mouse System with MEMS Accelerometers and Analog Read-Out Circuitry, Department of EECS, University of Michigan, Ann Arbor, MI 48109-2122.

MEMSense Press Release, http://www.prweb.com/releases/2004/7/prweb142179.htm,PRWeb The Free Wire Service.

APPARATUS AND METHOD FOR DETERMINING AND NUMERICALLY DISPLAYING A VOLUME DEPENDENT CHARACTERISTIC OF ANY UNSEPARATED PART OF AN ITEM

CROSS REFERENCE TO RELATED APPLICATIONS

This application claims the benefit of U.S. provisional application No. 60/893,228 filed on Mar. 6, 2007.

BACKGROUND OF THE INVENTION

The present invention concerns measurement devices and more particularly a device providing convenient measurement and numeric display of a volume dependent characteristic of any selected part of an item such as a fish fillet.

Such devices are described and claimed in U.S. Pat. Nos. 7,158,915 and 7,010,457 issued to the present inventor, both of which patents are hereby incorporated by reference herein.

In those patents, a device is described which includes a hand held elongated sensor member constrained to be spaced above a table surface at a fixed height by the presence of support structure such as a post extending down from each end of the sensor member. Both posts are held in contact with the table surface during stroking of the sensor member over the item so that the sensor member is positioned above the table surface at a fixed height which is sufficiently high to insure that the sensor member is able to be passed over an item lying on the table surface.

A displacement detector arrangement generates signals corresponding to the extent and direction of movement of the sensor member along the item. At the same time a sensor arrangement on the sensor member generates signals corresponding to the cross sectional contour of the item at each of its successive sections passed over by the sensor member as it is stroked along the item. Both the detector and sensor signals are processed by a signal processor to electronically calculate the volume of segments of the item passed over by the sensor member and a corresponding numeric value is displayed such as the price or weight of any segment of the item passed over by the sensor member.

As noted, the length of the posts positively determines the height at which the sensor member is spaced above the table while being passed over the item.

The sensor member support structure in most embodiments described in the above referenced patents comprises the two support posts, each projecting down from a respective end of the sensor member. A gantry support structure for the sensor member is also described in U.S. Pat. No. 7,158,915 which likewise maintains the sensor member at a predetermined fixed height above the table surface during movements of the sensor member over the item. Guiding the sensor member to pass over the item at a predetermined fixed height above the table and item has some disadvantages.

Since the support structure prevents the sensor member from moving down to be closer to the item it may be necessary to provide an ability to vary the dimensions of the support structure to accommodate thicknesses of the item greater than the height at which it is supported by the support structure, and this could be done with adjustable or replaceable sets of posts or adjustable gantry structure but this solution would add complexity and cost to the device.

The presence of the posts or other support structure also makes it impossible to use a knife blade on the sensor member to cut or score the item since the presence of the support structure would interfere with any attempt to bring the knife blade down to cut or mark the item.

The above referenced U.S. Pat. No. 7,158,915 to the present inventor also describes retractable posts to allow effective use of a cutting blade mounted on the sensor member, but this retractable post arrangement would also add complexity and cost to the device. Also, since the posts are held in contact with the table surface, and that surface could be greasy, dirty, marred, etc., this could create difficulties and inaccuracies in measurement.

It is an object of the present invention to provide an apparatus of the type described in which the sensor member does not have to have any portions in contact with the table surface and is freely movable to allow manual positioning and stroking of the sensor member at any height above the table surface and item and also to contact the item with a knife blade on the sensor member while still providing an accurate measurement of the volume of any segment of the item if the height of the sensor member is varied while being passed over the item.

SUMMARY OF THE INVENTION

The above recited object as well as other objects which will be understood upon a reading of the following specification and claims are achieved by providing a manually held and manipulated elongated sensor member in an apparatus of the type described in applicant's prior patents referenced above, which allows unguided positioning and stroking motion of the hand held sensor member so as to be able to be moved to any selected height while being passed over the item and table surface while still carrying out an accurate measurement of the volume of any unseparated part of the item. This is provided by compensating for any variations in height of the sensor member which may occur as the sensor member is passed along and over the item when calculating the volume of the part of the item passed over by the sensor member.

That is, since the height of the sensor member above the table surface and item may vary, that height is electronically monitored as by motion detectors detecting vertical movement relative to a reference position or by sensors which generate electronic signals corresponding to the distance from the sensors to points on the table surface or the upper surface of the item as it is moved along the item such that variations in the height of the sensor member may be determined and compensated for in carrying out calculations of the cross sectional areas of successive sections of the item passed over. That is, the item cross sectional area calculations compensate for any change in height of the sensor member as it is passed over the item to accurately determine the volume of any selected part including the whole of the item even if its height is varied as the sensor member is moved over and along the item.

The absence of any guiding or support structure on the sensor member eliminates any contact of any part of the sensor member with the support surface during measurement to minimize errors due to imperfect conditions of that surface.

Other additional features of the present invention include a powered knife for cutting or scoring a segment from the item, visual indicators for indicating the bounds of a selected part of an item, and a display separate from the sensor member which displays the volume, price or weight numeric values of any part including the whole of the item.

DETAILED DESCRIPTION

Figure 1:
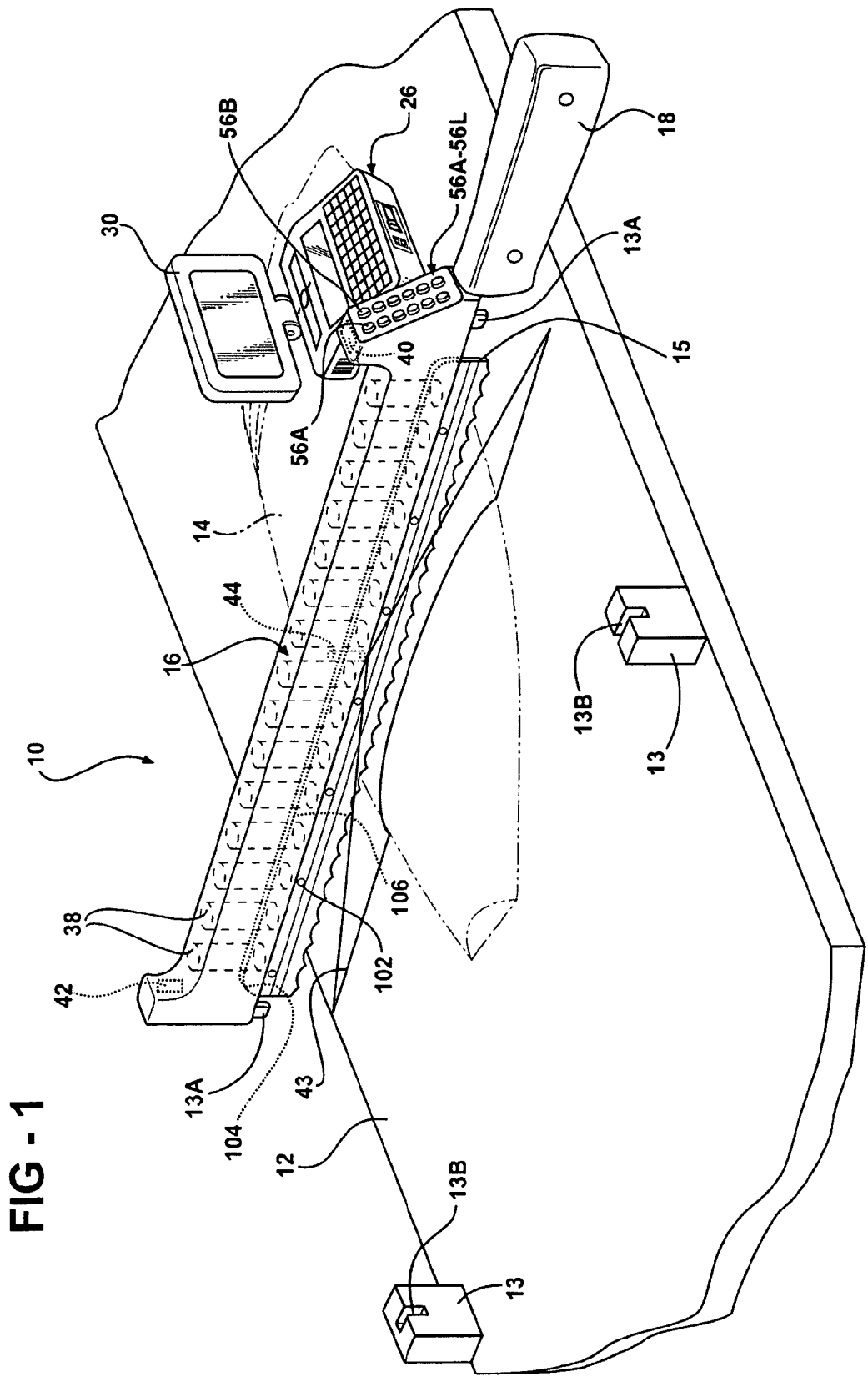
FIG. 1 is a pictorial view of an apparatus according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The apparatus and method according to the present invention provide a numeric display of a characteristic corresponding to the volume of any unseparated part (or the whole) of an item including the whole of an item, i.e., the volume, weight or cost of any selected part or the whole of an item by unguidedly passing a hand held and manipulated sensor member over the item while the item is resting on a table surface, the sensor member freely movable to any particular height relative the table and item while being held and manipulated by the user in being passed over and along the item.

As described in applicant's prior patents referenced above, the sensor member carries a sensor arrangement including sensors arranged along the sensor members which generate signals collectively corresponding to the areas of succeeding cross sections of the item which areas are calculated as the sensor member is moved over and along successive sections of the item from a reference position to a selected other position, the two positions defining therebetween any part including the whole of the item. According to one feature of the present invention, these calculations compensate for any changes in height of the sensor member allowed by its being manually passed over and along the item.

At the same time, a movement detector arrangement, which may be comprised of one or more microelectromechanical (MEMS) accelerometer motion detectors, generates signals corresponding to the movement of the sensor member as it is moved along and over the item. These sensor signals and movement detector arrangement signals are processed by a signal processor to calculate the volume of any part or the whole of the item lying between any two spaced positions of the sensor member relative the item.

The determination of any variations in height of the sensor member can be provided by the sensor arrangement sensing the distance from sensors that interact directly with the support surface in areas devoid of the item product. Such distances are used in conjunction with the sensor arrangement determined distances between sensors to points on the surface of the underlying item in order to determine the actual thickness and cross sectional areas of sections of the item lying beneath the moving sensor member.

Alternatively, the movement detector arrangement can be used to detect vertical movement of the sensor member and thus changes in height of the sensor member from a base reference height so that these changes can be added or subtracted from the sensed distances to points on the surfaces on each successive section of the item to eliminate any effect thereof on calculations of the cross sectional areas of these sections of the item.

As before, each volume determination may be converted into a corresponding weight or price value based on density and price per weight factors for the particular type of item, whereby numeric volume, weight and/or price (based on weight) values may be computed and displayed as the sensor member is passed along the item, thus enabling the operator to contemporaneously provide an on-looker with the volume, weight or price of any segment of the item before it is cut from the item.

Optionally, light sources or a single light source may be mounted on the sensor member for projecting a visible light line across each successive section of the item passed over by the sensor member to clearly visually indicate to the onlooker the bounds of a segment of the item corresponding to the numeric display.

A knife blade may optionally be mounted to the sensor member and used to thereafter cut or score the section or sections of the item defining the selected segment. The knife blade may be detachable and exchangeable with other knife blades of various characteristics so that knife blades suitable for specific items may be employed. A scored item may also later be cut to be segmented by a conventional knife or other cutting device.

According to another feature of the present invention, one or more powered cutting knife blades such as those known in the art may also be mounted on the sensor member, used to cut or score the item by merely lowering the sensor member while activating the blades of the knife to engage and cut the segment.

The apparatus may also include marking, scoring, sensing, cutting devices and other features such as those described in the above referenced U.S. Pat. Nos. 7,010,457 and 7,158,915. Devices and technologies other than the above referenced microelectromechanical (MEMS) accelerometer devices may also be employed as a displacement and inclination or tilt detector arrangement.

As disclosed in the above referenced U.S. Pat. No. 7,010,457, the movement detector arrangement is preferably comprised of one or more microelectromechanical or MEMS devices. In the present invention, such devices may include multi-axis accelerometers and gyroscopes that may be used to detect sensor member 16 (FIG. 1) motions, including movement of the sensor member 16 as it moves along and over an item 14, such as a fish fillet supported on a table surface 12, and generate signals corresponding to the extent and direction of movement of the sensor member 16 as it moves along and over the item 14. The table surface 12 can be provided by conventional materials, such as wood, plastic, laminate, etc.

In the embodiment illustrated in FIG. 1, motion detectors 40, 42 collectively comprising a movement detector arrangement generate signals corresponding to the change in position of the sensor member 16 as the sensor member 16 is moved along and over the item 14. As the sensor member 16 traverses along the surface 12 (and hence, the item 14), it may be manually moved over the item to any desired height in each successive position above the surface 12 and item 14. Sensors 38 generate signals which correspond to the distance from the sensor member 16 to points on the surface of each section of the item 14 lying directly beneath a particular sensor 38, as by sensing reflections of wave energy, i.e., emitted optical or acoustic waves as the sensor member 16 is moved along the item. The distances to these points can be sensed in a variety of ways, such as by measuring the time of flight of reflected acoustic waves, or as by utilizing spot triangulation techniques with optical transmitter/receiver sensors.

The surface 12 is flat and typically has areas on either side towards and away from the operator which are not occupied by the item 14 and those exposed areas would be at the maximum distance away from the sensor member 16 as determined from the signals of the sensors 38 or motion detectors 40, 42.

The distance from the sensor member 16 to the table surface 12 may be determined by signals from the motion detectors 40, 42, or by signals from the sensors 38 lying over and beyond the edges (towards and/or away from the operator) of the item 14 which may directly sense the distance from the sensor member 16 to the table surface 12. The difference in distance from the sensor member 16 to the table surface 12 and the distance from the sensor member 16 to points on the surface of the item 14 as determined by sensors 38, correspond to the thickness of the item 14 below each respective sensor 38. Collectively, these thickness determinations correspond to the cross sectional contour and area of each successive section of the item 14 passed over by the sensor member 16.

The signals from the motion detectors and sensor 38 signals are processed in a signal processor 300 (FIG. 3), which may be contained in a control case 26, which may be detachably mounted to the sensor member 16 as shown in FIG. 1 or remotely located with a wireless connection to the motion detectors 40, 42 and sensors 38 to allow calculation of the volume of each segment of the item 14 defined between selected successive positions of the sensor member 16. Utilizing a stored density value for the item and/or the cost per weight unit of the item 14, segment volumes may be converted into weight or price (based on weight) values which are displayed in a numeric display on an attached screen 30.

Figure 3:
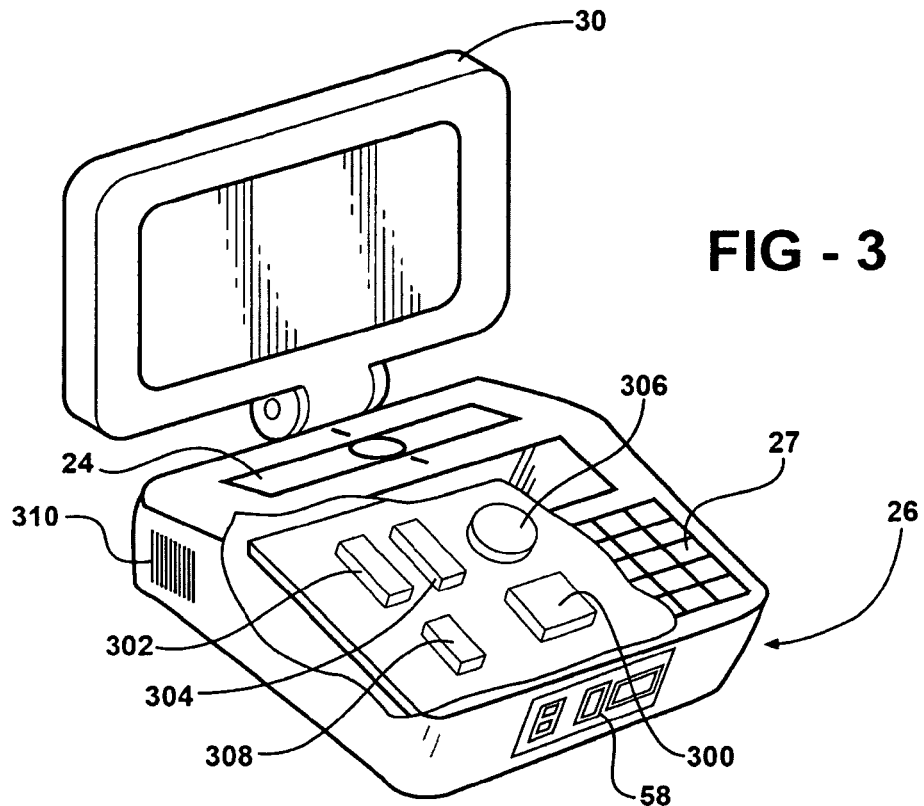
FIG. 3 is a pictorial view of a control case and numeric display of a type which may be included in the apparatus, the outer case partially broken away to show signal processing electronics and other components housed in the case.

As noted in the above referenced patents issued to the present inventor and as shown in FIG. 3, the control case 26 may include a programmable microprocessor based signal processor 300, display 30, control electronics, microprocessors, sensors, input/output ports 58, a battery 306, a wireless communication module 308, data input means (i.e., a keyboard 27), and an excessive tilt or out of level alarm 302 responsive to tilt and out of level condition detector 24 which detects when the sensor member 16 is in an excessive tilted or out of level position.

A mercury based level sensor or other level indicating sensors known in the art may be employed for detector 24, i.e., motion detectors such as those commonly used in 3-D "air mouses" and hand-held game controllers such as the Nintendo Wii.

Functions of the input/output ports 58 may include uploading control commands, item descriptive information (i.e., product codes, data codes, etc), density, and price/weight values into processor 300. Port 58 functions may also include downloading time, product information, calculated weight and price values, daily logs of an operator's processing activities, etc. Temperature sensor 304 and air vent 310 can be used to insure accurate acoustic wave sensor operation which typically is affected by temperature changes.

As contrasted to the various embodiments of the apparatus shown in the U.S. patents referenced above issued to the present inventor, sensor member 16 does not include any height constraining support structure; but instead, the sensor member 16 is manually held and manipulated by a user in an upright and level orientation and freely moved to any selected height in successive positions above the item 14 as the sensor member 16 is traversed over and along the item 14. As the user manually moves sensor member 16 over the surface 12 and item 14, the vertical distance from the base of the sensor member 16 to the underlying item 14 or surface 12 may be varied, or alternatively be maintained substantially constant as the user chooses, regardless of the contour of the item 14 which is directly below the sensor member 16.

For example, the user may choose to have the sensor member 16 follow the contour of the item 14 by having the sensor member 16 move closer to the item 14 as the height of the upper surface of the item 14 decreases due to a decrease in thickness of the item 14, or the operator may choose to have the sensor member 16 move upwards away from the item 14 as the thickness of the item 14 increases or vice versa. Any downward or upward movement of the sensor member 16 may be carried out by the operator as desired. Hence, the sensor member 16 can just as easily remain at a constant height above the item 14 (or surface 12) as the sensor member 16 traverses the item 14 (surface 12), or the sensor member 16 may move further upwards away from the item 14 as the height of the upper surface of the item 14 decreases, or the sensor member 16 may move closer to the item 14 as the height of the upper surface of the item 14 increases.

As noted above, the sensor member 16 may have an associated excessive tilt or out of level detector 24 (FIG. 3) which may be located in the detachable case 26 that sounds the alarm 302 when the sensor member 16 orientation tilts or becomes unleveled to a greater than an allowable extent such that significant cross sectional area calculation errors could occur. Thus, as the sensor member 16 traverses the item 14, the alarm 302 may sound (or other indicator initiated) indicating that the item 14 scan will need to be redone.

Various mispositioning conditions of the sensor member 16 such as out of plumb, out of square, out of level etc., may be detected and their extent measured by means such as the sensor member movement detector arrangement, level condition detector 24, or sensors 38, and mathematically compensated for in the volume calculations, if necessary, so that the scan can proceed without interruption. Such mispositioning conditions to an excessive extent may also be simply detected thus causing alarm 302 to sound (or other indicator initiated) indicating that the item 14 scan will need to be redone, rather than measuring the extent of those conditions and compensating for them in the calculations.

In the embodiment illustrated in FIG. 1, a motion detector arrangement may utilize microelectromechanical (MEMS) accelerometer devices comprising the motion detectors 40, 42 which generate signals collectively corresponding to the displacement of the sensor member 16 as the sensor member 16 is passed over and along the item 14 so as to enable determination of the position and orientation of the sensor member 16 at any point in its motion over the item 14 and which may also serve to determine any other motions such as skewing of the sensor member 16. Other devices, technologies, and sensor arrangements may be utilized as displacement and tilt detectors in place of the described MEMS accelerometer devices.

As the sensor member 16 of the present invention is not equipped with posts or other support structure to positively guide the sensor member 16 at a set height above the support table surface 12, it has advantages over a sensor member 16 configuration which does include such support structure as described in the above referenced patents of the present inventor.

If a sensor member has fixed length support posts, items 14 of a relatively greater thickness than the vertical clearance provided by such support posts could require the use of a sensor member with larger length support posts so that the sensor member 16 will be positioned at a height having sufficient clearance to pass above a thicker item 14. Having multiple sets of sensor members each matched to various item thicknesses would be expensive as well as inconvenient in that different sets of sensor members may need to be used to process items 14 of varying thickness.

The operator could interchange various length support posts (e.g., if such support posts were threaded to the sensor member, or by otherwise easily detached connections) to ensure that the sensor member will be positioned high enough to provide enough clearance so that sensor member can easily traverse over items 14 of various thickness without being excessively cumbersome. While this would add flexibility in the use of the sensor member, it would require additional operator time to implement as compared to a sensor member configuration according to the present invention that does not include such support posts.

The sensor member 16 of the present invention thus saves the cost of providing multiple sensor member 16 configurations and also saves the operator processing time as different sensor members do not need to be interchanged (or different length sets of support posts do not need to be interchanged) in order to be useable with items 14 of grossly varying thickness.

Post retraction and extension mechanisms can also be provided for a sensor member as described in U.S. Pat. No. 7,158,915 to retract and extend support posts respectively in order to allow an attached knife blade to be lowered sufficiently to cut or score an item.

The sensor member 16 configuration of the present invention eliminates any need for support posts with such extension and retraction mechanisms. The item 14 may be scored, marked or cut by simply lowering the manually held sensor member 16 having a blade 15 affixed thereto to engage the item 14, whereby the blade 15 may score the item 14, or the item 14 may be cut to be segmented by applying a downward force on the blade 15 while the blade 15 is moved in a back-and-forth sawing motion or while integrated powered blades 71 (FIG. 8) are activated as the sensor member 16 is lowered as described hereinafter.

The sensor member 16 configuration of the present invention thus saves the operator time by eliminating the time needed to retract and or extend such retractable support posts if necessary. The elimination of support posts and their associated retraction and extension mechanisms also simplifies the design, manufacture, and maintenance of the sensor member 16, and reduces the possibility of damage to the sensor member 16 as there are fewer components exposed to the environment and subject to wear and breakage. The simplified design also results in a lower manufacturing cost of the sensor member 16.

FIG. 1 shows the attachment of an optional knife blade 15 to the sensor member 16, utilizing protrusions 102 snap fitted into corresponding holes in the knife blade 15, which also has ends snapped into recesses 104 adjacent each end of the sensor member 16. The back of the knife blade 15 is received into a recess 106 extending along the sensor member 16. Easy attachment or detachment of the knife blade 15 enables the use of different types of knife blades for the requirements of different items 14 of varying characteristics.

The calculations of volume (and the corresponding associated weight and price values) of uncut segments of the item 14 according to the present invention are similar to the calculations previously disclosed in the above referenced patents of the present inventor for the sensor member 16 that includes support posts. A difference of the present invention is that the sensor member 16 may be manually moved over the item 14 while varying the height of the sensor member 16 over item 14, and such possibly varying height must be accounted for in calculating the cross sectional areas of sections of the item 14 passed over by the sensor member 16.

Figure 4:
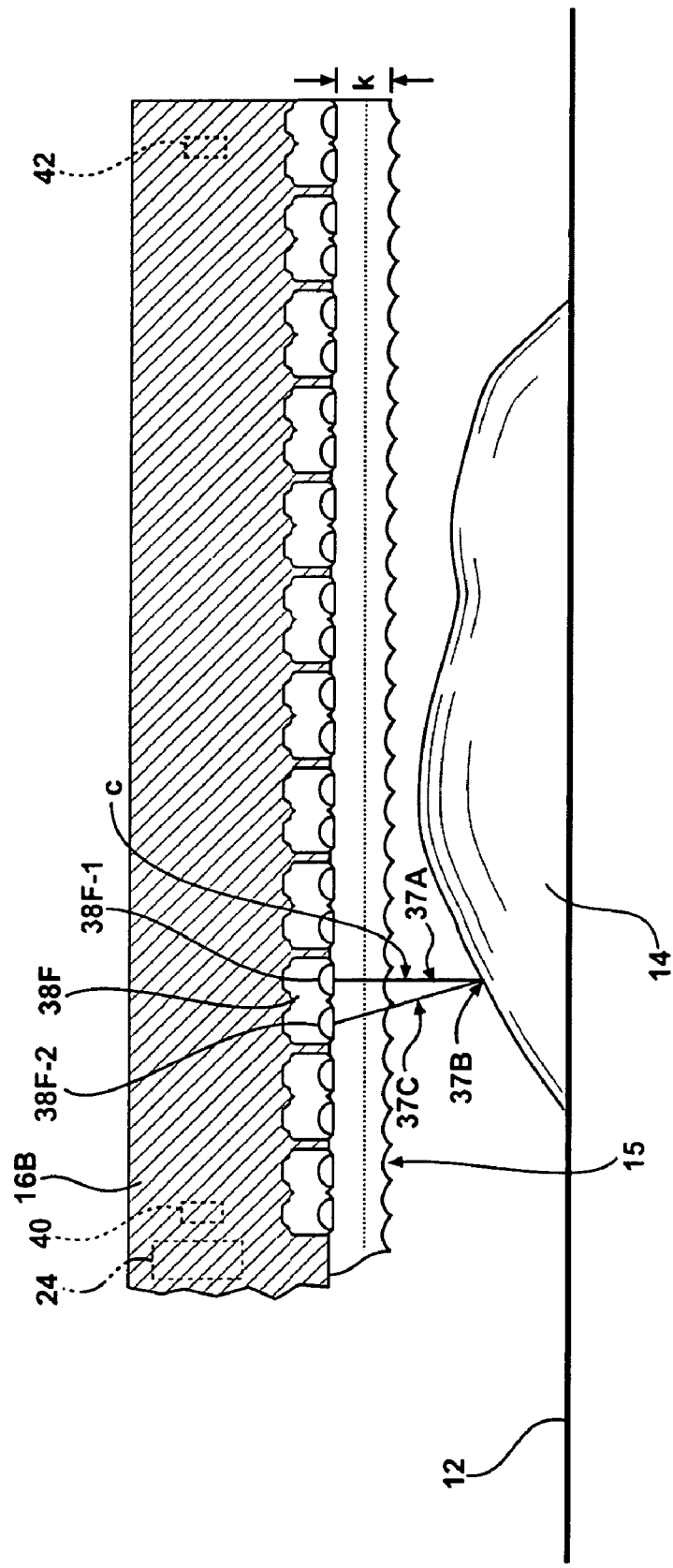
FIG. 4 is a fragmentary side elevational and partially sectional view of an alternative embodiment of the sensor member of the type shown in FIG. 1 being held over an item at an arbitrary height above the item, which is provided with optical emitters and receivers comprising a height determining sensor arrangement, the triangulation relationship of emitted and received light waves being diagrammatically indicated.
Figure 6:
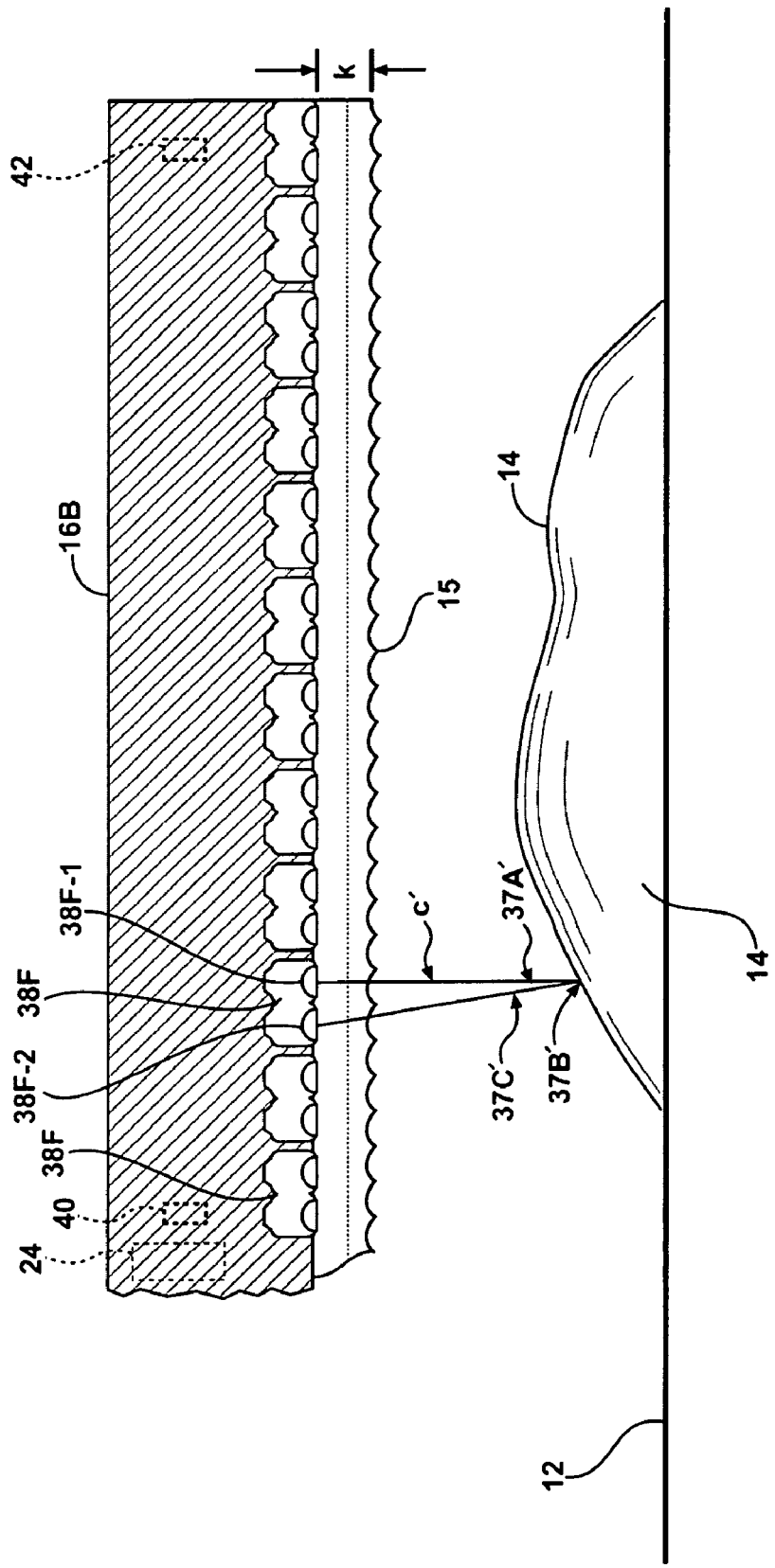
FIG. 6 is a fragmentary side elevational and partially sectional view of the sensor member shown in FIG. 4 but with the sensor member lifted to a different arbitrary height above the table and item, diagrammatically indicating the changed triangulation relationship at that height.
Figure 7:
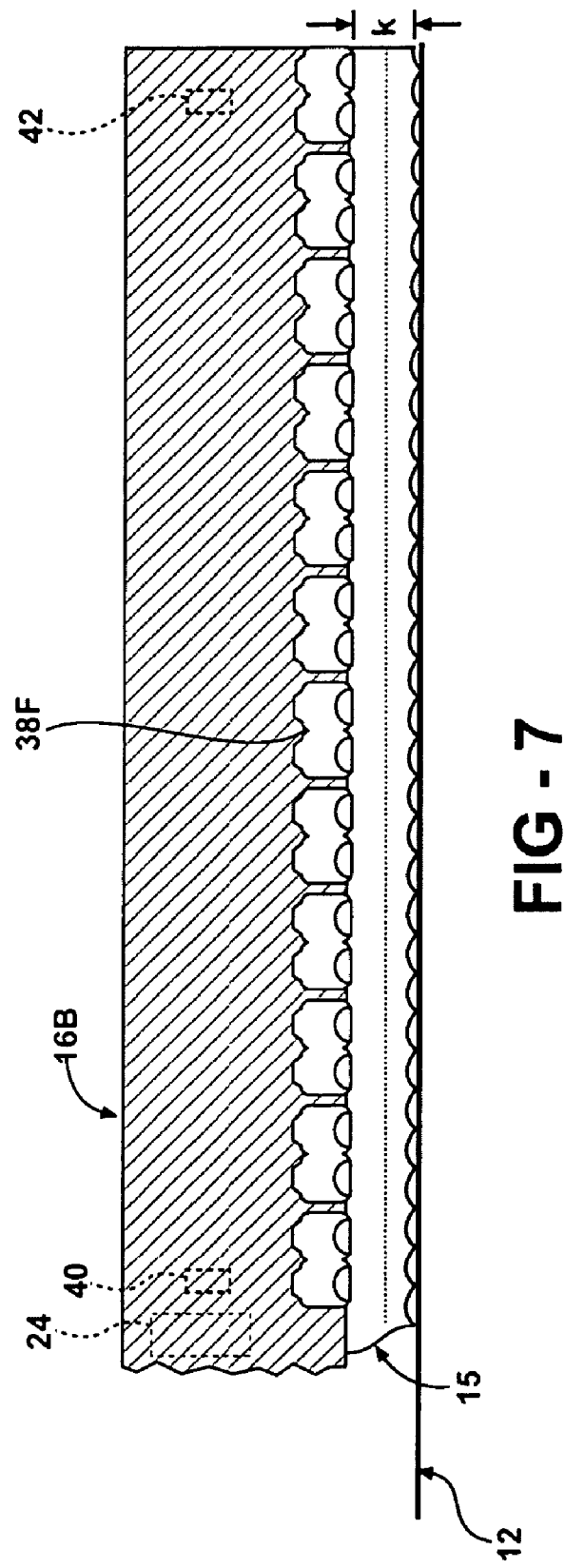
FIG. 7 is a fragmentary side elevational and partially sectional view of the apparatus shown in FIGS. 4 and 6 with the sensor member shown lowered onto a table surface on which an item is to be placed.

One method for accurately determining the area of cross sections of an item 14 while utilizing a freely manipulable sensor member 16 such as the sensor member 16B shown in FIGS. 4, 6 and 7 is as follows:

Before sensor member 16B (FIGS. 4 and 6) is passed over the supporting table surface 12 and the item 14, the bottom edge of blade 15 is positioned vertically oriented flush against the surface 12 as shown in FIG. 7.

Alternatively, the sensor member 16B can be placed in rest blocks 13 (FIG. 1) fixed relative to the table surface by any suitable means in which the sensor member 16 is held in a level, square to the table, and plumb initial position by locator blades 13A mating with slots 13B providing an initial zero reference position.

In either event, pushbutton 56A of pushbuttons 56A-56L may be pressed (FIG. 1) whereby corresponding signals are sent to signal processor 300 to indicate that the sensor member 16B is in a "reference zero height" position. As illustrated in FIG. 4, since the height of blade 15 itself is a constant value, k, the distance from the sensors 38 (e.g., 38F) to the base of the sensor member 16B is k.

As the sensor member 16B is manually lifted from surface 12 or rest 13, and moved along the item 14 so as to be positioned over each successive section of the item 14 defining a segment of interest, the motion detectors 40, 42 generate electronic signals corresponding to the vertical and horizontal movements of the sensor member 16B which are sent to the signal processor 300 so that the changing position of the sensor member 16B may be tracked (including tracking my changes in the height of the sensor member 16B in relation to the "reference zero height"). When the sensor member 16B is directly over the beginning section of the item 14 of interest, a second pushbutton 56B is pressed which causes signals from the motion detectors 40, 42 to be sent to signal processor 300; such signals corresponding to the position of the sensor member 16B defining the beginning of the part of the item 14 of interest. The pressing of the pushbutton 56B also generates signals from the sensors 38 to be sent to the signal processor 300; such signals in conjunction with signals of the motion detectors 40, 42 collectively allow determination of the thickness of the item 14 at each of a series of points across the section of the item 14 and thus collectively correspond to the contour and cross sectional area of the section of the item 14 that lies directly below the sensor member 16B.

As the sensor member 16B is manually moved over and along the item 14, the signal processor 300 receives both updated signals from the motion detectors 40, 42 and signals from the sensors 38 which are processed by the signal processor 300 together with stored density values corresponding to the particular type of item 14 to calculate the volume and corresponding weight of the part of the item 14 defined by each position of the sensor member 16B over the item 14 and the price of the part can also be calculated from a stored price per unit weight factor. A display 30 numerically shows these calculated values contemporaneously with the movement of the sensor member 16B along a given part of the item. Updated weight and price information is displayed as the sensor member 16B advances along the item 14 by numeric display 30 and/or other devices (such as external displays 66, cash registers 68, receipt printers 70, etc, (shown in FIG. 8) which may be linked to sensor member 16B via a wireless communications module 308.

When the sensor member 16B reaches a section of the end of a desired part of the item 14, the operator may simply lower the sensor member 16B onto the item 14 whereby blade 15 makes contact with the item 14 so that die item 14 may be scored or marked or cut to be segmented by the blade 15. A downward pressure as well as a back-and-forth motion of the sensor member 16B may be applied to carry out this scoring, marking or cutting of the item 14. A marked or scored item 14 may alternatively later be fully cut or segmented by a conventional knife.

As the sensor member 16B traverses over the item 14, the motion detectors 40, 42 detect the change in position of the sensor member 16B (including the changing height positions of the sensor member 16B in relation to the surface 12, or to the "reference zero height"). Since the distance from the location of the motion detectors 40, 42 to the base of the blade 15, and to the height sensors 38, and to all other components on or in the sensor member 16B are known values, the changing locations of all positions on or in the sensor member 16B may be calculated as offsets by the signal processor 300 as the sensor member 16B changes position. This updated data may be used in the calculation of the segment volume, weight, and/or price as exemplified by the calculations described in U.S. Pat. No. 7,158,915.

Signals generated by one or more sensors 38 may also be used in lieu of signals from the movement detector arrangement to determine the distance of the sensor member 16B to the surface 12 as it moves over the item 14. In this case, the sensors 38 enable the measurement of the distance from the sensors 38 to the surface 12 where the item 14 is absent from the surface 12. Thus, those sensors 38 which are located off to one side of the item 14 will interact directly with the surface 12 to determine changes in height of the sensor member 16B (and also variations in inclination of the sensor member 16B).

The sensors 38 may depend on reflected waves. If reflected waves are absent or too weak as for example caused by a mispositioned sensor member 16B, this can result in a fault condition indicated to the operator.

Many different types of distance sensors 38 may be implemented, such as, but not limited to, acoustic and optical. Some types of such distance sensors 38 have been described in the above referenced patents of the present inventor and are applicable to sensor members without support structures of the present application.

The following is a description of "Spot" Triangulation Based Optical Height Sensors, and their use with sensor members 16B that do not incorporate support posts or other height constraining support or guide structures.

Referring to FIGS. 4-7, "spot" triangulation is based on optical distance sensors 38F shown mounted along the underside of sensor member 16B as a linear array arranged along the length of the sensor member 16B. Each distance sensor 38F is comprised of an optical emitter 38F-1 and optical receiver 38F-2 unit. Various optical emitter technologies may be employed using visible or nonvisible light such as LED devices and lasers.

The emitter unit 38F-1 projects a light beam perpendicularly downward along the path 37A to cause a light "spot" 37B to impinge onto a point on sections of the upper surface of the item 14. The receiver unit 38F-2 receives reflections to image this spot along the path 37C onto an internal CCD (Charge Coupled Device) array or other PSD (Position Sensitive Detector) such as a photodiode array included in the receiver unit 38F-2.

Figure 5:
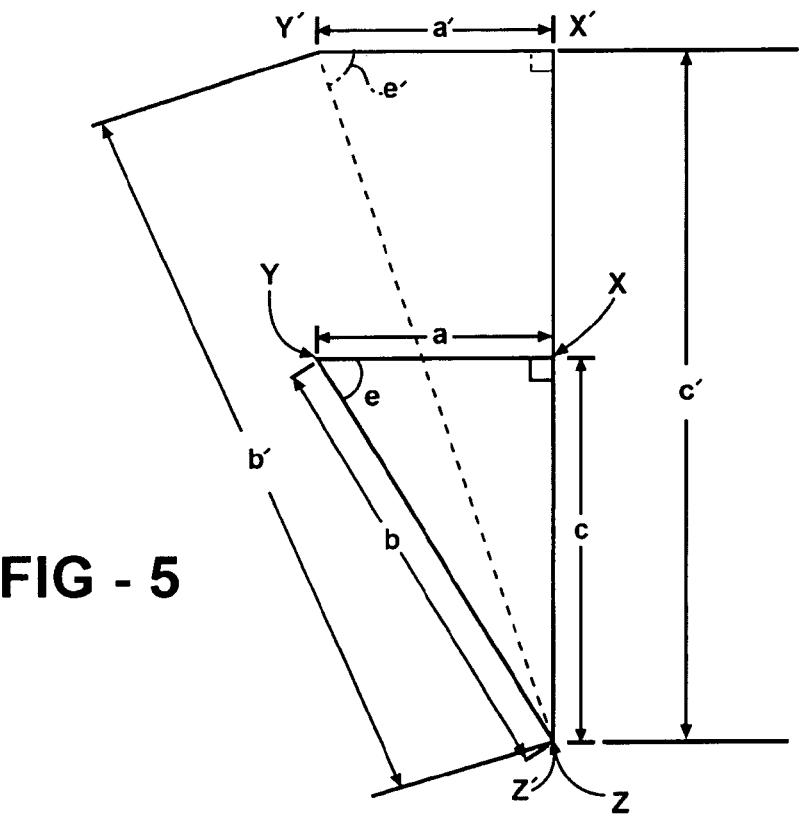
FIG. 5 is a diagram of the spatial relationship of the light path to and from optical receivers and emitters shown in FIG. 4 with an item to be measured.

FIG. 5 illustrates the above spatial relationships, whereby emitter 38F-1 corresponds to "X", receiver 38F-2 corresponds to "Y", spot 37B corresponds to Z, the distance between emitter 38F-1 and receiver 38F-2 corresponds to a known constant "(a)", the distance between emitter 38F-1 and the point of impingement on the item 14 surface 37B is "(c)", the distance between spot 37B and receiver 38F-2 is "(b)", and the imaged angle at the vertex Y of the triangle XYZ is "(e)".

The receiver unit 38F-2 determines the imaged angle "(e)" of the spot 37B. The distance (c) from the emitter 38F-1 to the perpendicularly projected spot 37B on the upper surface of item 14 is calculated by a processor such as one integrated into sensor 38F or a signal processor 300.

A right triangle is formed at the vertex X of the three triangular coordinates YXZ. Therefore, the following trigonometric relationship applies:

$$\mathrm{Tan}(e) = c/a \qquad (I)$$

Thus, the distance (c), from the emitter 38F-1 to the projected spot 37B is expressed as:

$$c = (a)\mathrm{Tan}(e) \qquad (II)$$

The distance (a), between the emitter 38F-1 and receiver 38F-2, is a known constant for the specific sensor 38F employed. The angle (e) is determined by the Position Sensitive Detector thus enabling the calculation of Tan(e). Therefore, the product of (a) and Tan(e) yields the distance, (c), between the emitter 38F-1 (X) and the projected spot 37B (Z).

Thus, the height of the item 14 above the surface 12 that lies directly below emitter 38F-1 is the difference of the just calculated height (c) from the distance of the height sensor emitter 38F-1 to the surface 12 as calculated by processor 300 from signals obtained from the motion detector arrangement 40, 42 and the "reference zero height" measurement. As the physical height of the knife blade 15 protruding from the base of the sensor member 16B is known constant "k" (FIG. 4), this value may be used to offset height variation values in the calculations. The distance of the height sensor emitter 38F-1 to the surface 12 may also be determined by processor 300 from signals received from sensors 38F that directly interact with an area or areas on support surface 12 which are not occupied by item 14.

FIG. 6 illustrates the sensor member 16B moved to an arbitrarily different height "(c')" than the height (c) depicted in FIG. 4. The spatial relationships corresponding between the new parameters (a'), (b'), (c'), 37A', 37B', 37C' and angle "(e')" are illustrated in FIGS. 5 and 6, and the associated height determination calculations are similar to those above. Thus, the item 14 segment volume (and weight, price) may be continuously calculated by the microprocessor 300 and displayed on display 30 or other device as the sensor member 16B traverses the item 14 whereby the sensor member 16B may continuously vary in height.

The above illustrates a method whereby the heights of points on the surface of sections of the item 14 (in relation to the surface 12) that directly pass beneath sensors 38F (e.g., emitters 38F-1) are determined for a sensor member 16B that is at an arbitrary height above the surface 12 (and hence, at an arbitrary height above the item 14). Collectively, the signals from the sensors 38 comprise contour defining data for a section of the item 14 lying directly beneath the sensors 38 from which the cross sectional area of the section can be calculated utilizing the determined height of the sensor member 16B. Such cross sectional area data along with the information corresponding to a sensor member 16B movement (and thus, corresponding to movement of all points of the sensor member 16B, such as the positions of the sensors 38F) as supplied by the motion detectors 40, 42, enables signal processor 300 to calculate the volume of any part of the item 14 traversed by the sensor member 16B as exemplified by the calculations presented in the above referenced U.S. Pat. No. 7,158,915.

Utilizing the density and price per unit weight value corresponding to the item 14, signal processor 300 may convert volume values into numeric weight or price (based on weight) values, which may be seen by an operator and an on-looker on display screen 30 or other equipment at the same time that the sensor member 16B is in position over that section defining an end boundary of the segment of the item 14 of interest.

Many different types of distance sensors 38 such as acoustic sensors may be mounted to the sensor members 16 not having any associated support structure.

Figure 2:
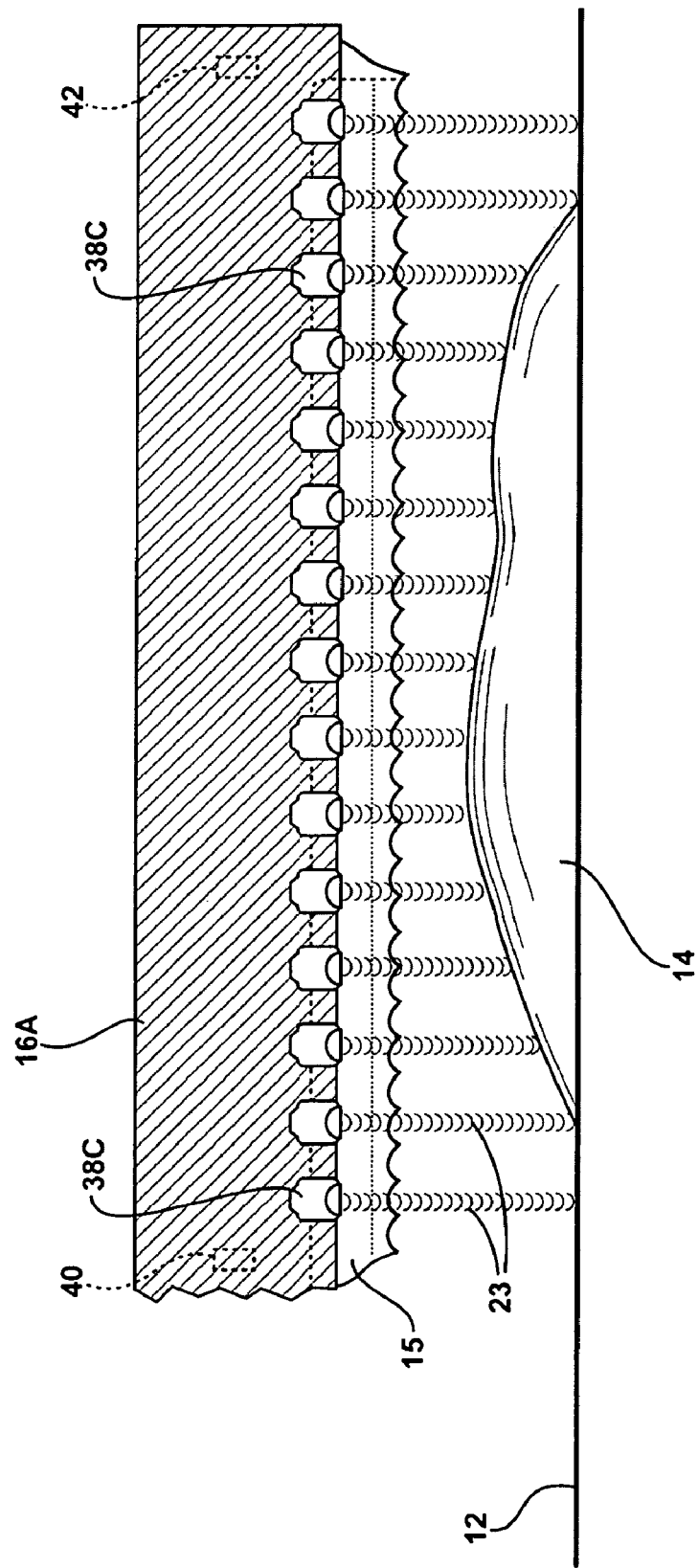
FIG. 2 is a fragmentary side elevational partially sectional view of a sensor member according to the invention showing a height determining acoustic sensor arrangement on the sensor member being held over an item at an arbitrary height above the item.

Referring to FIG. 2, acoustic distance sensors 38C are shown installed in the sensor member 16A, disposed in a linear array extending lengthwise along the underside of the sensor member 16A. Each acoustic sensor 38C is comprised of an acoustic emitter/receiver unit and is recessed into the sensor member 16A. Various acoustic emitter/receiver technologies may comprise the sensor 38C. A common technology utilizes piezoelectric ceramic material as the active sensor element. Piezoelectric ceramic material enables the conversion of electrical to acoustic energy as well as the conversion of acoustic to electrical energy. This property enables the same piezoelectric ceramic material to act as both the emitter as well as the receiver in the same sensor 38C. Alternatively, a separate acoustic emitter and receiver may comprise the sensor 38C.

As the sensor member 16A traverses the item 14, the acoustic emitters 38C direct acoustic pulses against respective points on the upper surface of a section of the item 14 lying directly beneath the sensor member 16A. The determination of the height of the item 14 top surface above the table surface 12 directly below each sensor 38C corresponds to the round-trip time required for the emitted acoustic pulses 23 to reach and reflect off of the item 14 top surface, and return to the respective originating overhead acoustic receiver in each sensor 38C. This round-trip time is commonly called the Time-Of-Flight and its determination is well known in the art for computing distances in many products such as camera range finders, burglar alarm motion detectors, and robotic collision avoidance devices.

Subtracting the acoustically determined sensor 38C to item 14 distance from the sensor member 16A to support surface 12 distance as may be determined from "reference zero height" calculations or direct sensor 38C to surface 12 measurement yields the height of points on the item 14 upper surface in relation to the table surface 12 which in turn directly corresponds to the thickness of the item 14 at those points. Collectively, the points along the item 14 at each section defines the contour and thus the cross sectional area of each section of the item 14 passed over by the sensor member 16A.

The temperature sensor 304 which may be located in case 26 senses ambient temperatures and produces signals corresponding thereto, whereby signal processor 300 receives such temperature sensor signals and calibrates the computations of distances derived from acoustic sensor 38C signals for the sensed temperature. Air vent 310 allows free circulation of ambient air to the temperature sensor 304.

Figure 8:
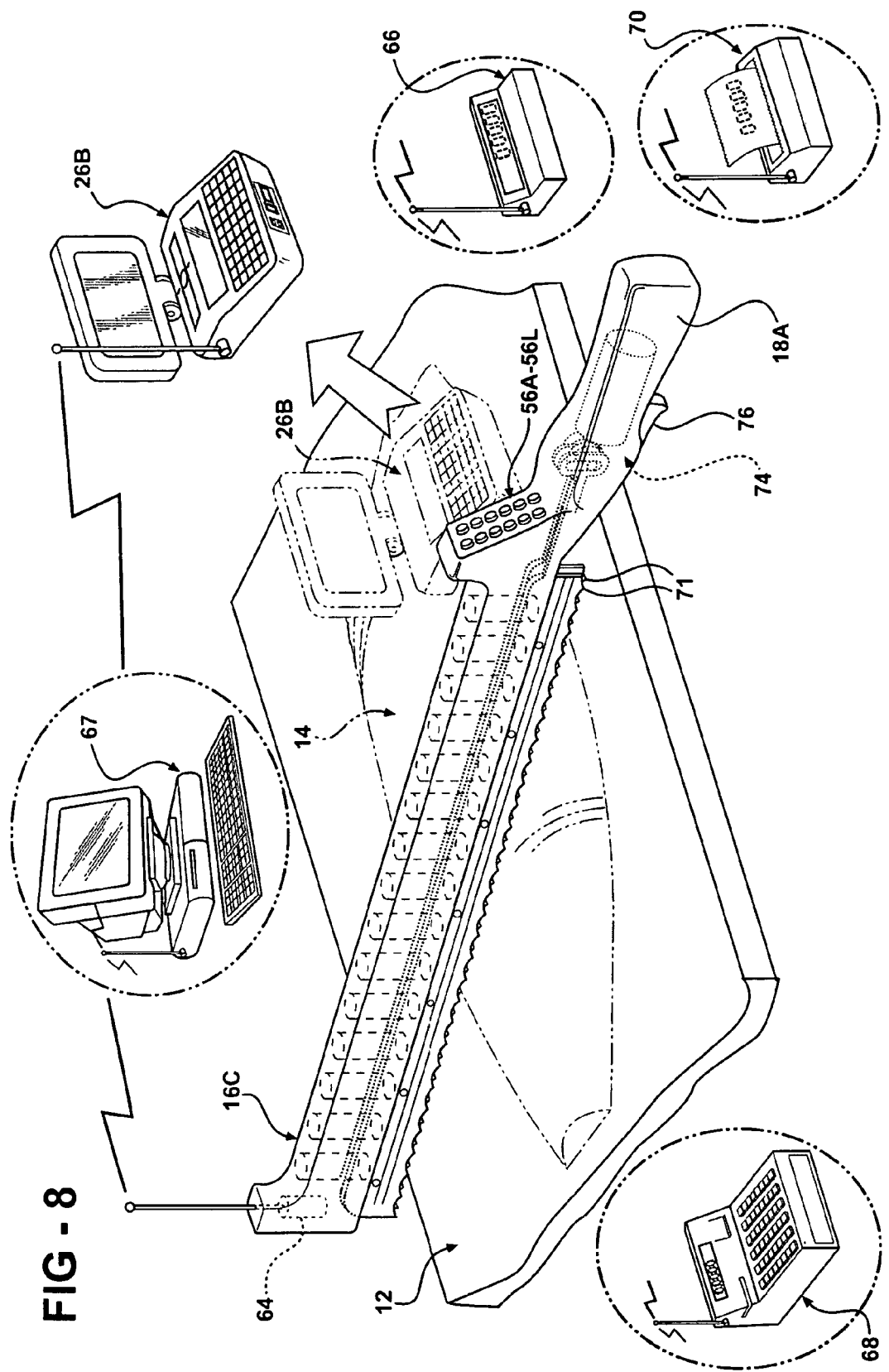
FIG. 8 is a pictorial view of another embodiment of an apparatus according to the invention including wirelessly coupled accessories and electrically powered knife blades mounted to the sensor member.

When the position of a sensor 16 is used to visually indicate to an observer the section of the item 14 which defines a part of the item 14 of interest, it may be desirable to make it easier to see the bounds of that part of the item 14 as it corresponds to the numeric display 30 or other display i.e., external display 66 (FIG. 8). Since the sensor member 16 may have appreciable thickness and is spaced above the item 14, the exact item 14 section lying directly beneath the sensors 38 on the sensor member 16 may not be easily discernable by an onlooker. Similarly, the viewing angle of an observer such as a customer or operator may affect his or her ability to determine the exact location of that section. When sensors 38 that utilize visible light emitters are used (i.e., "spot" triangulation height sensors 38F), the light projected onto the item 14 surface indicates the lengthwise position along the sensor member 16 that extends over the item 14 section of interest, however, with other non-illuminating sensors such as acoustic height sensors 38C, (FIG. 2), it may be desirable to provide an indication to the observer of the exact item segment corresponding to the numeric value shown by the display 30. An accurate discernment of the item 14 segment bounds may be enabled by projecting a narrow band or line of visible light onto the item 14 over the section the contour of which is being determined from the signals generated by the sensors 38.

Figure 10:
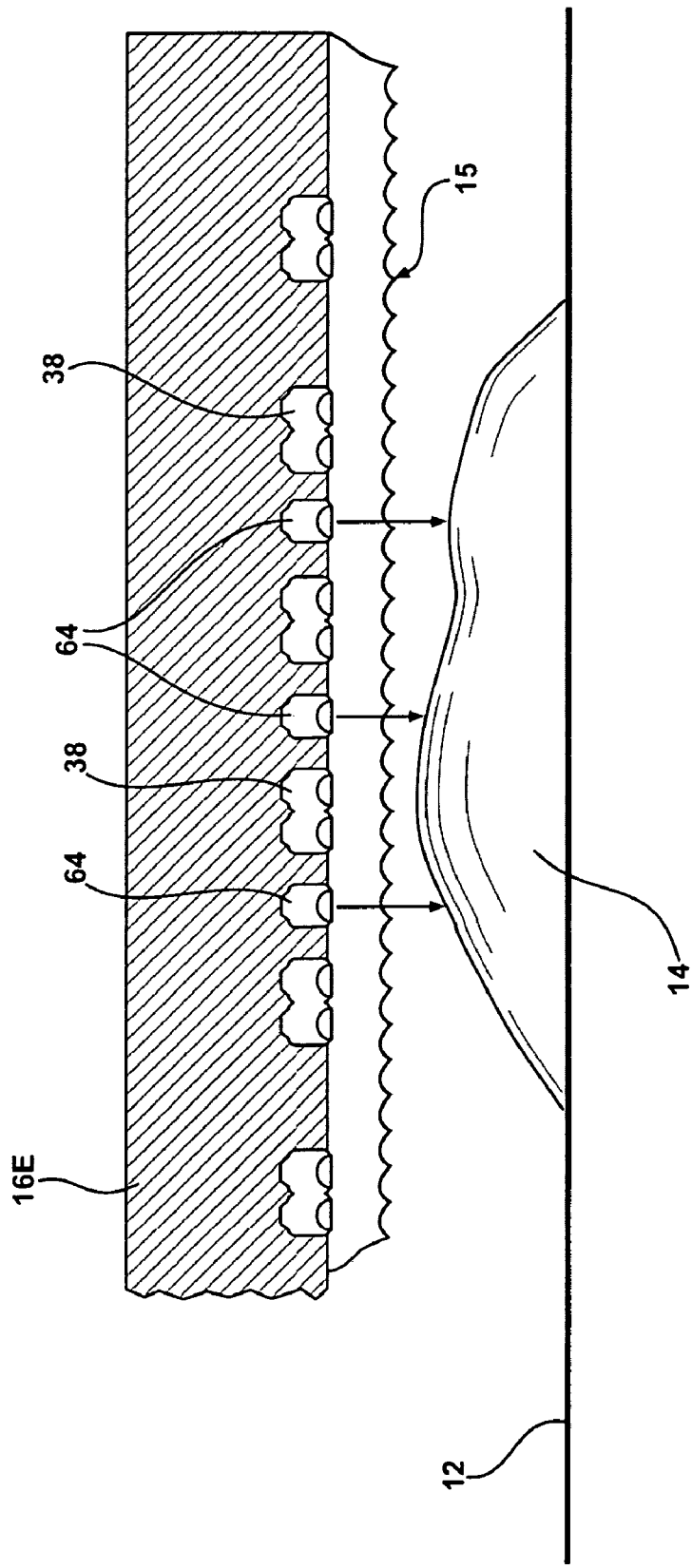
FIG. 10 is a fragmentary and partially sectional side elevational view of another embodiment of sensor member according to the invention having interposed visible light emitters located between optical triangulation sensors on the underside of the sensor member.
Figure 11:
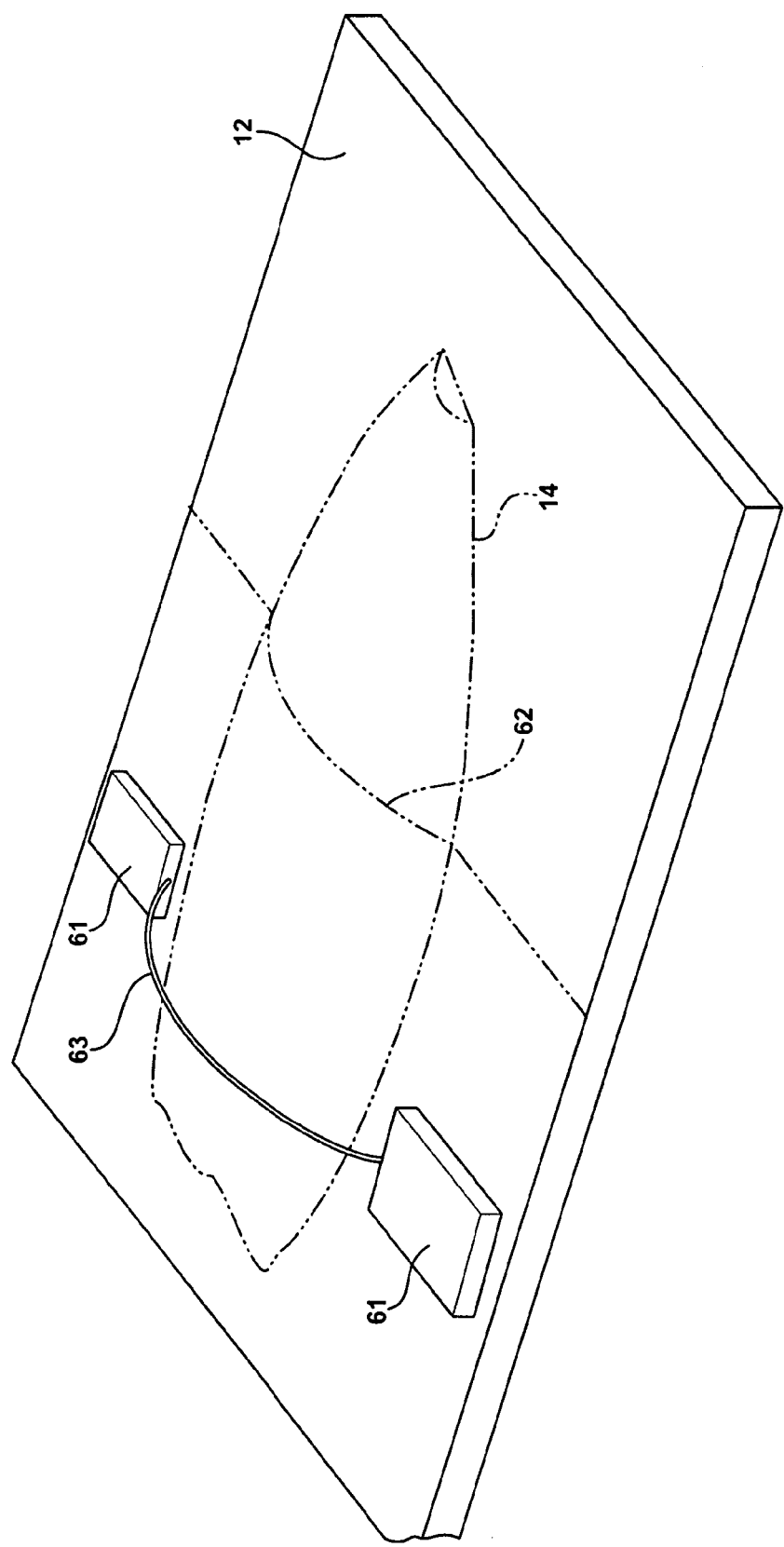
FIG. 11 is a pictorial view of an item on a table surface with a reference indicator element in a position extending across one section of an item and a visual indicator light line projected onto another section of the item.

FIG. 10 shows another arrangement for producing the projected visible light line 62 (FIG. 11). A series of lamps, visible light emitting diodes, lasers or other visible light emitters 64 (FIG. 10) are mounted along the underside of a sensor member 16E, suitably masked and focused to project downwardly from the sensor member 16E and create the narrow light line 62 aligned with the sensors 38 on the sensor member 16E so that the light line 62 lies on the same item 14 section which has its cross sectional area calculated from the signals of the sensors 38. Thus, the numeric value displayed on display 30 and the position of the sensor member 16E at any time will correspond to the segment of the item 14 bounded on one side by the light line 62. The light line 62 is readily visible on the surface of the item 14 to an observer even if the observer is standing some short distance away. This indication removes any problems with parallax effects and makes it easy to discern the part of the item 14 corresponding to the numeric display 30.

As shown in FIG. 11, where the segment or part of the item 14 of interest is not bounded by an end of the item 14, a selected start reference section of the item 14 at an intermediate point along the item 14 may be temporarily indicated as by a curved wire marker element 63 held in position on the surface of the table 12 by the weight of attached blocks 61, or by magnetic attraction of magnetized blocks 61 to a magnetic support surface 12. The marker element 63 is placed in alignment with a narrow light line projected from the sensor member 16 onto the item 14 at a start or reference position of the sensor member 16. The sensor member 16 is then shifted to a second position where a narrow visible light line 62 is projected onto the item 14 at a section spaced from the start position. The light line 62 is projected from the underside of a sensor member 16E (FIG. 10). The weight or cost of a segment of the item 14 defined between the start section below wire marker element 63 and the offset section at the light line 62 in the second position of the sensor member 16 will be numerically shown by display 30.

Alternatively, the selected start reference section may be indicated by other means such as by scoring or segmenting the item 14 surface by knife blade 15.

Figure 12:
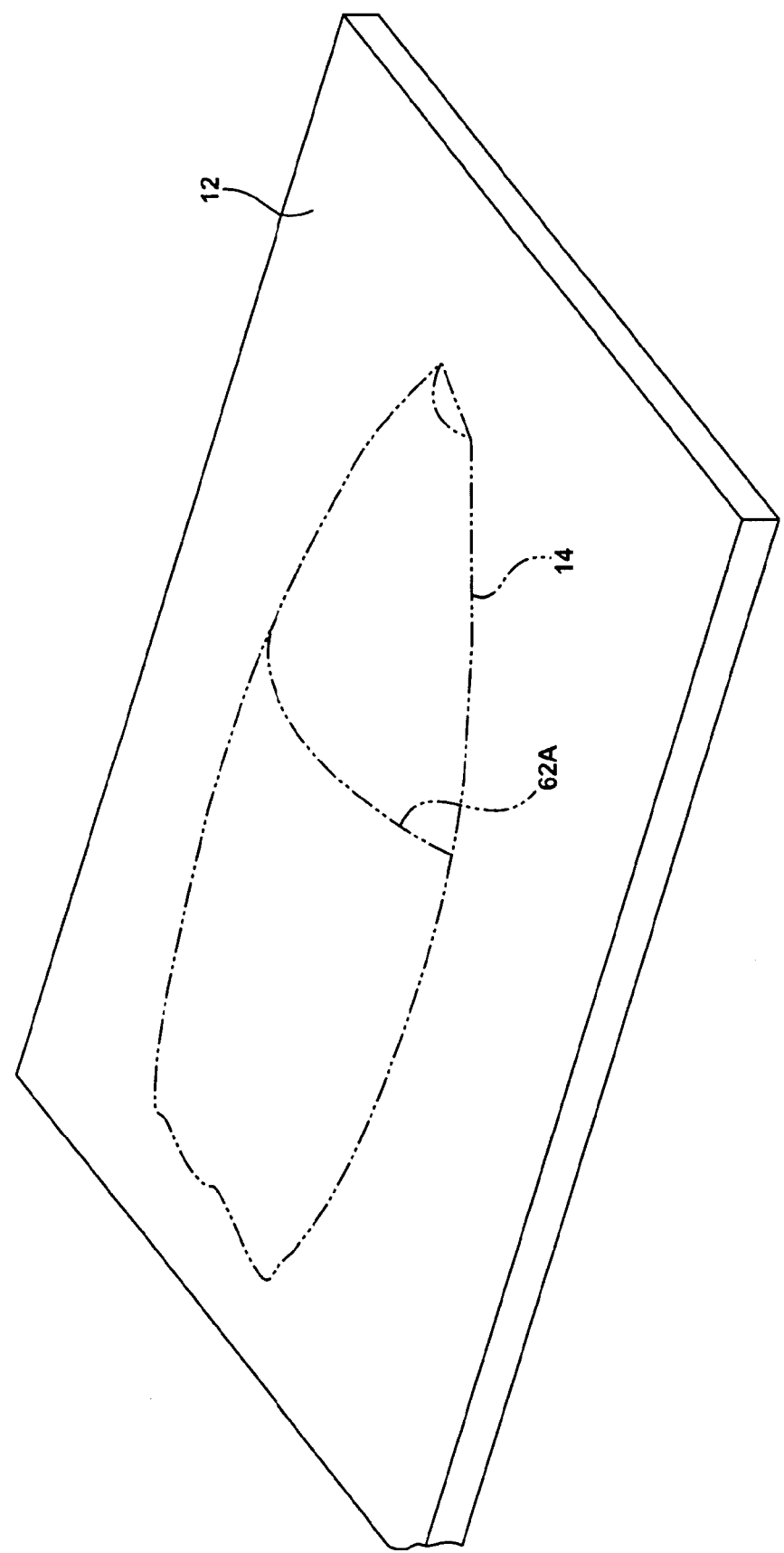
FIG. 12 is a pictorial view of an item on a table surface having a visual indicator light line projected only onto the item itself.

As noted in FIG. 11, the projected light line 62 produced by an array of light emitting emitters 38F-1 (FIG. 4) arranged along the underside of sensor member 16B extends beyond the item 14 and onto the support surface 12. Since an onlooker is interested in knowing the bounds of a particular segment of the item 14, the illumination of the surrounding table support surface 12 may be confusing and undesirable. When sensors 38 that utilize visible light emitters 38F-1 are employed (i.e. "spot" triangulation sensors 38F), the processor 300 may monitor the item 14 height below each sensor 38F and disable the emission of light from the sensors 38F (i.e., the sensors 38 are deactivated) that are on the outside (away from the item 14) periphery from the outermost sensors 38F that first detect the absence of any part of the item 14 below their positions. As the sensor member 16B traverses over the item 14, when the outermost sensors 38 detects an underlying presence of the item 14, the previously deactivated sensors 38 are activated by the processor 300 and emit visible light. The result exemplified by the above procedure is a light line 62A (FIG. 12) which predominately extends over the item 14 surface, and only minimally onto the support surface 12.

Similar to the procedure described above, the processor 300 may activate or de-activate dedicated (non-sensing) light emitters 64 (FIG. 10) to illuminate predominately the underlying item 14 and not the surrounding support surface 12 by analyzing sensor 38 signals from sensors 38 that themselves do not emit visible lights (i.e., acoustic sensors 38) to determine areas on the table surface 12 that are not occupied by the item 14.

As shown in FIG. 1, a visible line 43 may advantageously be projected in a fan shape from a single laser beam source 44 on the underside of sensor member 16 to impinge onto the item 14 surface and table surface 12 in a line to visually indicate the section of the item 14 that lies directly under the sensor member 16.

Such fan shaped laser beam sources are very well known and are used for creating visually observable lines on walls, etc. and examples are described in U.S. Pat. Nos. 7,237,341; 6,735,879; and 6,502,319.

The previously referenced U.S. Pat. Nos. 7,158,915 and 7,010,457 to the present inventor describe other marking and scoring devices, as well as other technologies and implementations which may also be employed with the sensor member 16 described herein.

Sensor member embodiments that do not include support structure may also traverse the surface 12 (and hence, the item 14) in a forwards and backwards (and vice versa), left to right (and vice versa) manner, as well as move in a free form manner such as utilizing wave-like or oblique in relation to the device operator movements and other non-linear movements. Accommodation of such movements were previously disclosed in the above referenced U.S. patent regarding sensor members that utilize support posts and the necessary compensation calculations are set out in detail therein (U.S. Pat. No. 7,158,915).

The above examples and descriptions illustrate sensor members that do not make physical contact with the item 14 as they traverse "over" the item 14; however, these sensor members may also make incidental physical contact with the item 14 at one or more contact points as the sensor member traverses along the item 14.

FIG. 8 shows another embodiment of the invention featuring wirelessly coupled external accessories, i.e., alpha-numeric display 66, computer 67, printer 70, cash register 68, electrically powered knife blades 71, and a detachable control case 26B.

Wireless transmitter/receiver 64 circuitry is carried by the sensor member 16C to transmit detector-sensor signals to detachable case 26B containing a wireless communication module 308 and programmable microprocessor 300 for carrying out the calculations of segment volumes, weights, and prices from these signals. Control circuitry which may include a wireless transmitter/receiver 64 may be mounted at various locations in or on the sensor member 16C including inside of handle 18A (such mounting not shown in FIG. 8).

A separate stand alone alpha-numeric display 66 could be employed to provide a viewable display of the weight-price results and product information. The separate cash register 68 may also be wirelessly coupled to the control case 26B to ring up a sale based on a selected part or segment of the item 14. A separate printer 70 also could be wirelessly coupled to detachable control case 26B to enable a printout of the transaction and measurement details. Standalone computer 67 may be used for various functions such as keeping track of employee work flow and efficiency.

The sensor member 16C would still include distance sensors 38 and motion detectors 40, 42 as described above as well as control buttons 56A-56L used in carrying out the measurement process.

Cutting or scoring of the item 14 may be carried out with a pair of powered serrated cutting blades 71 which are relatively reciprocated by a motor-gearing unit 74 housed in the handle 18A, turned on and off with a trigger switch 76 positioned to be in contact with the fingers of a user while gripping the handle 18A. Such electric knives, which can be battery powered or connected to a standard power outlet, may have various features and configurations and are well known in the art, as for example, described in U.S. Pat. No. 4,631,827.

Figure 9:
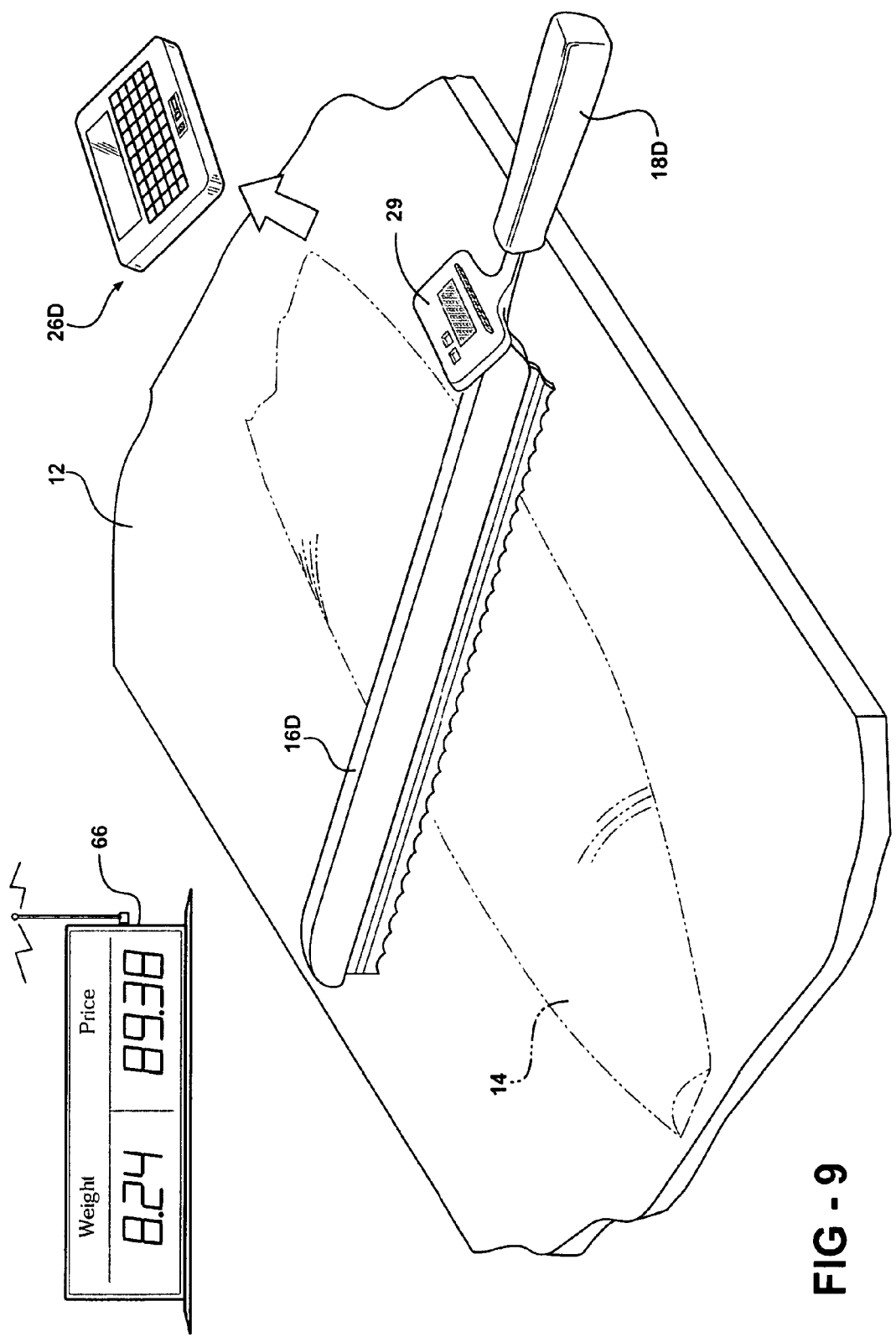
FIG. 9 is a pictorial view of another embodiment of the apparatus according to the invention showing a detachable control case.

FIG. 9 shows another embodiment of the invention in which a completely separate numeric display 66 is provided and a wireless control casing 26D is detachably mounted to the sensor member 16D, by mating connections to a seat 29 permanently attached to the handle 18D. The handle 18D is vertically offset to improve knuckle clearance with the table surface 12. The handle 18D may contain the various electronic components (not shown in FIG. 9) necessary to communicate with a detached control case 26D and other wireless coupled components (not shown).

Figure 13:
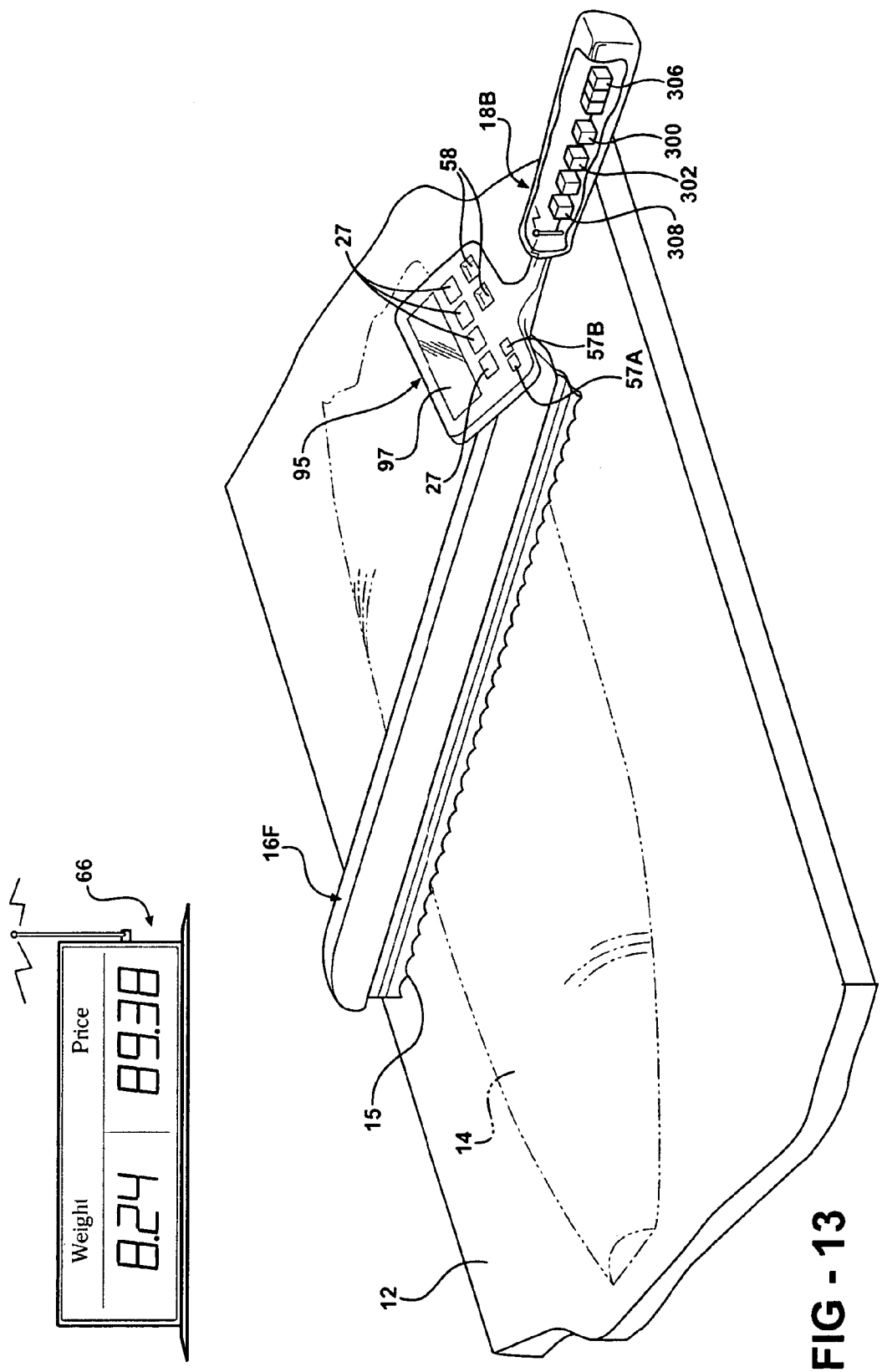
FIG. 13 is a pictorial view of another embodiment of an apparatus according to the invention.

FIG. 13 shows another embodiment of the invention in which electronic components (i.e., wireless communications module 308, out-of-level alarm or indicator 302, programmable microprocessor controller 300, power supply 306) are located in the handle 18B included in a sensor member 16F. External display 66 communicates with wireless communications module 308. Console 95 contains an integrated alphanumeric screen 97, keypad 27, input/output ports 58, and control buttons 57A and 57B which function in similar fashion as control buttons 56A, 56B as previously described.

The invention claimed is:

1. An apparatus for generating and displaying numeric values corresponding to the volume of any selected segment of an item comprising:
   a support defining a generally horizontally planar surface for supporting said item placed thereon;
   a hand held sensor member freely movable horizontally and vertically over said support surface and an item resting thereon;
   a horizontal movement detector arrangement which generates signals corresponding to the extent of horizontal movement of said sensor member over said support surface in a direction along said item;
   a sensor arrangement on said sensor member including sensors generating signals corresponding the distances between a series of points along the sensor member and a series of points on an upper surface of said item lying beneath said points on said sensor member arranged extending across each of successive sections of said item passing beneath said sensor member as said sensor member is moved along and over said item;
   a height detector arrangement producing signals corresponding to the height of said points along said sensor member above said support surface at each successive horizontal position to which said sensor member is moved along said item;
   a signal processor receiving said signals generated by said horizontal movement detector arrangement, said sensor arrangement, and said height detector arrangement and computing from said sensor arrangement signals and said height detector arrangement signals the cross sectional area of successive sections of said item passed over by said sensor member and from said computed cross sectional area values and said horizontal movement detector arrangement signals computing a volume of said selected segment of said item defined by movement of said sensor member in being passed over and along said item from a reference position to another position displaced horizontally in said direction along said item; and,
   a display displaying a numeric value corresponding to said computed volume of said selected segment of said item as computed by said signal processor.

2. An apparatus according to claim 1 wherein said sensor member has a knife blade mounted thereto extending along a bottom portion thereof enabling cutting or scoring of said item.

3. An apparatus according to claim 1 wherein said height detector arrangement includes one or more height detectors adjacent either end of said sensor member sensing the distance from portions of said sensor member lying beyond said item to said support surface and generating corresponding signals thereto.

4. The apparatus according to claim 3 wherein said sensor arrangement sensors each direct wave energy down onto an upper surface of said item and wherein said height detector arrangement height sensors and said sensor arrangement sensors each direct wave energy onto said support surface and said item respectively and both said height and sensor arrangement sensors sense reflections therefrom in determining said height of said sensor member above said support surface and also distances to from points on an upper surface of said item to said sensor member.

5. The apparatus according to claim 4 wherein said wave energy is electromagnetic radiation.

6. The apparatus according to claim 4 wherein said wave energy is acoustic waves.

7. The apparatus according to claim 1 wherein one or more electrically powered cutting blades are mounted to said sensor member which powered cutting blades may be selectively activated to cut or score said item.

8. The apparatus according to claim 1 further including one or more visible light sources on said sensor member projecting a light line down onto and across said item when activated whereby providing a visual indication of the position of said sensor member along said item.

9. The apparatus according to claim 1 wherein a plurality of visible light sources are mounted along said sensor member together with a plurality of distance sensors included in said sensor arrangement, each visible light source projecting light down onto each section of said item passed over when said sensor member is moved along and over said item.

10. The apparatus according to claim 9 wherein each of said light sources is included in a respective one of said sensors.

11. The apparatus according to claim 9 wherein said processor determines which light sources are positioned directly over said item and activates only those visible light sources directly over said item and not onto said support surface.

12. The apparatus according to claim 11 wherein each of said light sources are included in a respective one of said sensors.

13. The apparatus according to claim 1 wherein said sensor arrangement comprises a series of sensors arranged along said sensor member sensing the distance from said sensor arrangement to points on an upper surface of said item.

14. The apparatus according to claim 13 wherein each of said sensors comprises an emitter and a receiver offset from each other and wherein said distance determinations are is carried out by the process of triangulation of emitted and reflected beams of wave energy.

15. The apparatus according to claim 1 wherein said height detector arrangement includes a motion detector arrangement.

16. The apparatus according to claim 15 wherein said motion detector arrangement includes a motion detector arrangement.

17. The apparatus according to claim 16 wherein said accelerometer arrangement includes one or more multi-axis microelectromechanical accelerometers.

18. The apparatus according to claim 15 wherein said height detector arrangement also detects excessive tilt, skew or out of level conditions of said sensor member and an alarm is activated in response thereto.

19. The apparatus according to claim 1 wherein said sensor member is elongated and has unobstructed bottom side extending along the length thereof which can be moved down into contact with said support surface by manual lowering of said sensor member.

20. A method of displaying a numeric value corresponding to the volume of any selected segment of an item comprising:
   disposing said item on a support defining a generally horizontal planar support surface;

moving an unsupported and manually held sensor member freely movable in both vertical and horizontal directions to a first selected position extending completely across said item at a selected vertical height above said support surface, and horizontal position over and along said item on said support surface, said first selected position comprising a reference position with respect to said item;

manually moving said hand held sensor member from said reference position to pass over and along said item from said reference position to a second horizontally displaced selected position along said item extending completely across said item at a selected height thereabove;

generating sensor signals corresponding to distances between points along said sensor member to corresponding points on an upper surface of each successive section of said item lying beneath said sensor member as said sensor member is moved over and along said item to said second selected position;

detecting the extent and direction of horizontal movement of said sensor member in passing said sensor member over and along successive sections of said item to said second position and generating signals corresponding to said movement;

detecting the height of said points along said sensor member above said support surface at each successive horizontal position of said sensor member as said sensor member is moved manually along said item and generating corresponding signals to said height of said points along said sensor member;

processing said generated sensor distance signals, said detected horizontal movement signals and said detected height signals to calculate therefrom the volume of the segment of said item lying between said first reference position and said second displaced horizontal selected positions of said sensor member;

deriving a numeric value corresponding to said calculated volume of said segment of said item; and, displaying said numeric value thereby derived.

21. The method according to claim 20 further including initially providing a base reference for determining each height assumed by said sensor member as said sensor is moved horizontally along and over said item, including placing said sensor member in a reference vertical position prior to moving said sensor member over and along said item.

22. The method according to claim 21 wherein both said height of said sensor member and said horizontal movements of said sensor member are detected by one or more motion detectors mounted on said sensor member generating said signals corresponding to said vertical and horizontal movement of said sensor member from said reference position to thereby detect therefrom the height of said portions of said sensor member lying directly over said support surface at each horizontal position thereof as well as to detect the extent and direction of horizontal movement of said sensor member along said item.

23. The method of claim 22 further including detecting excessive tilt, skew or out of level condition of said sensor member and activating an alarm in response thereto.

24. The method according to claim 21 wherein said sensor member is provided with an unobstructed bottom side, and wherein said bottom side is placed into contact with said support surface to establish said reference vertical position.

25. The method according to claim 20 wherein said height of said sensor member above said support surface is detected from signals generated by a distance sensor included at either end of said sensor member lying beyond said item to be positioned over said support surface lying beyond said item.

26. The method according to claim 20 wherein detecting said height of said sensor member above said support surface is carried out by detecting the extent and direction of vertical motion of said sensor member when being moved along and over said item.

27. The method according to claim 20 further including projecting a visible light line across said item from one or more light sources on said sensor member to visibly indicate the position of said sensor member along said item.

* * * * *